United States Patent
Osawa et al.

[15] 3,653,719
[45] Apr. 4, 1972

[54] WHEEL CAP FIXING DEVICE

[72] Inventors: Shigeru Osawa, Tokyo; Michio Kanazawa, Sagamihara, both of Japan

[73] Assignee: Topy Industries, Limited, Tokyo, Japan

[22] Filed: Nov. 26, 1969

[21] Appl. No.: 880,170

[30] Foreign Application Priority Data

Dec. 17, 1968 Japan..................43/92,030

[52] U.S. Cl..........................301/37 S, 301/108 S
[51] Int. Cl............................B60b 7/06
[58] Field of Search................301/37 S, 37 P, 108 S

[56] References Cited

UNITED STATES PATENTS 2,428,469 10/1947 Plant......................301/37 S
3,356,421 12/1967 Trevarrow...............301/37 S
3,549,204 12/1970 Spisak....................301/108 S
3,561,820 2/1971 Chaivre...................301/37 S
3,554,536 1/1971 Richter...................301/108 S

FOREIGN PATENTS OR APPLICATIONS 212,251 11/1924 Great Britain.............301/108

Primary Examiner—Richard J. Johnson
Attorney—Fleit, Gipple & Jacobson

[57] ABSTRACT

This device uses a cap nut provided at its flank with a flange which is urged through an elastic washer of a rubber substance and a wheel cap against a wheel disc when the cap nut is threadedly engaged with a stud bolt firmly secured to a vehicle hub.

2 Claims, 5 Drawing Figures

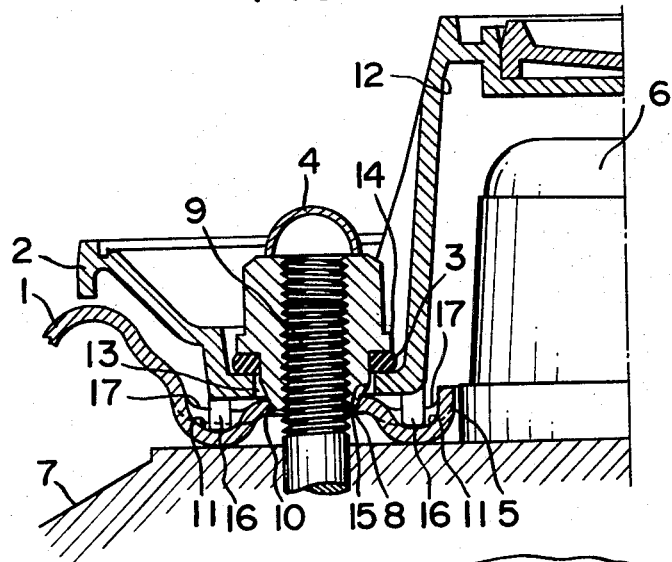
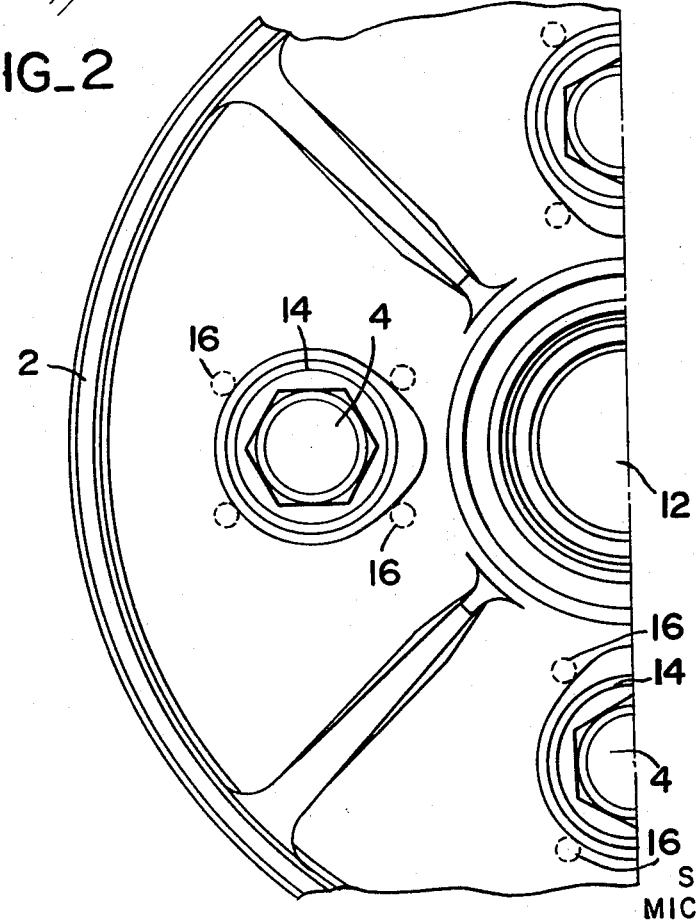

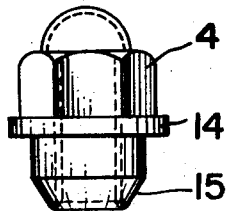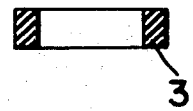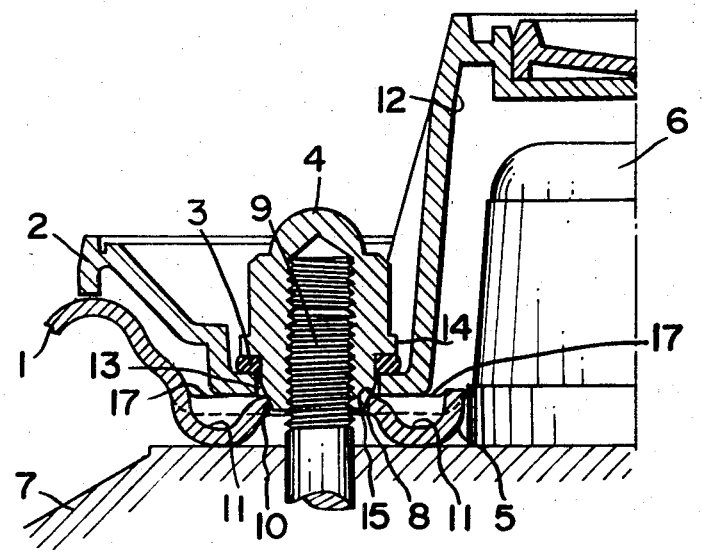

WHEEL CAP FIXING DEVICE

This invention relates to improvements in wheel cap fixing devices for fixing a wheel cap to a wheel disc secured to a vehicle hub.

An object of the invention is to provide a wheel cap fixing device which is simple in construction and adapted to safeguard a wheel cap from becoming removed without necessitating any special means for fixing the wheel cap to a wheel disc secured to a vehicle hub.

Other objects will appear in the following specification, reference being had to the drawings, in which:

FIG. 1 is a longitudinal sectional view of an embodiment of the invention;

FIG. 2 is its plan view;

FIG. 3 is a front elevation of a cap nut for use in the invention;

FIG. 4 is a longitudinal sectional view of an elastic washer for use in the invention; and FIG. 5 is a longitudinal sectional view of a modified embodiment of the invention.

Referring first to FIGS. 1 – 4, there are shown a wheel cap fixing device according to the invention which comprises a wheel disc 1, a wheel cap 2, an elastic washer 3, and a cap nut 4.

The wheel disc 1 is provided at its center with an opening 5 through which extends a projecting boss 6 of a vehicle hub 7 and provided around the center opening 5 with at least four holes 8 arranged concentrically with the center opening 5 and each of these holes 8 being extended through by a stud bolt 9 rigidly secured to the vehicle hub 7. That part of the wheel disc 1 which surrounds each of the holes 8 is raised to form a seat 10 adapted to be engaged with the cap nut 4. The wheel disc 1 is provided around the raised seat 10 with an annular indentation 11 arranged concentrically with the raised seat 10.

The wheel cap 2 covers the wheel disc 1 and is provided at its center with a projecting boss 12 and also provided around the projecting boss 12 with at least four holes 13, each of which being aligned with each of the holes 8 and extended through by the stud bolt 9. That portion of the wheel cap 2 which surrounds each of the holes 13 is adapted to be engaged with the raised seat 10 of the wheel disc 1.

The cap nut 4 is provided at its flank with a flange 14 and adapted to be threadedly engaged with the stud bolt 9. The end 15 of the cap nut 4 is formed into a conical shape and extends through each of the holes 13 of the wheel cap 2 and adapted to be brought into engagement with the raised seat 10 of the wheel disc 1.

Between the flange 14 and that part of the wheel cap 2 which surrounds the hole 13 is arranged the elastic washer 3 of a rubber substance and other similar flexible substances.

The wheel cap 2 includes at least four legs 16 projected downwards from the under surface of that part of the wheel cap 2 which surrounds the hole 13 and adapted to be engaged with the annular indentation 11 of the wheel disc 1 and arranged such that when the cap nut 4 is fastened to the stud bolt 9 these legs 16 are subjected to the movement of the flange 14 through the elastic washer 3 and hence the free ends of these legs 16 are urged against the bottom surface of the annular indentation 11 of the wheel disc 1, thereby fixing the wheel cap 2 to the wheel disc 1. The annular indentation 11 of the wheel disc 1 is bridged over by radially extending ribs 17 formed integrally with the wheel disc 1 and adapted to reinforce the raised seat 10 which is weak owing to the presence of the hole 8 at its center.

The legs 16 are arranged around the raised seat 10 and extend through the gaps formed between the reinforcing ribs 17 such that when the legs 16 are urged against the bottom surface of the annular indentation 11 the wheel cap 2 is secured without likelihood of inclination to the wheel disc 1.

The free ends of the legs 16 may be modified in form by cutting, for example, by a file so as to conform with any desired shapes of the wheel disc 1, with the result that the wheel cap 2 can be fixed to the wheel disc 1 in an extremely safe manner irrespective of the different shapes of the wheel disc 1.

As above mentioned, the invention makes it possible to utilize the cap nut 4 for securing the wheel disc 1 to the vehicle hub 7 and urge the flange 14 against the elastic washer 3 thus fixing the wheel cap 2 to the wheel disc 1. That is, the wheel cap 2 covering the wheel disc 1 can be fixed through the elastic action of the elastic washer 3 to the wheel disc 1, which affords the advantage that the wheel cap 2 can be fixed to the wheel disc 1 without being subjected to excessive force so that the wheel cap 2 can be prevented from becoming damaged. The invention is capable of utilizing threaded engagement between the stud bolt 9 and the cap nut 4 for securing the wheel disc 1 to the vehicle hub 7 and also of utilizing co-fastening action of the flange 14 and the elastic washer 3 for the purpose of fixing the wheel cap 2 to the wheel disc 1 so that it is possible to deform the wheel cap 2 in conformity with the deformation of the wheel disc 1. As a result of this, the additional advantage is obtained that, contrary to the conventional wheel cap, there is no risk of the wheel cap 2 being detached from the deformed wheel disc 1. Moreover, the use of the cap nut 4 for securing the wheel disc 1 to the vehicle hub 7 in case of fixing the wheel cap 2 to the wheel disc 1 ensures inspection of the degree of fastening of the cap nut 4 with respect to the stud bolt 9 without removing the wheel cap 2 and further provides the important advantage that the stud bolt 9 can be protected from becomming dirty by means of the cap nut 4, and that no special means is necessary for fixing the wheel cap 2 to the wheel disc 1, thus making the construction simple.

FIG. 5 shows a second embodiment of the invention wherein the wheel cap 2 is not provided with the legs 16. In the present embodiment the level of the ribs 17 for reinforcing the raised seat 10 of the wheel disc 1 is made substantially the same as that of the raised seat 10. Thus, when the under surface of that portion of the wheel cap 2 which surrounds the hole 13 is directly urged against the top surfaces of the raised seat 10 and the ribs 17, the wheel cap 2 is fixed to the wheel disc 1. That part of the wheel disc 1 which surrounds the hole 3 to form the raised seat 10 may be made flat with the center hole 8 formed therein. To such a case may also be applied the embodiment shown in FIG. 5 and the same advantageous effect as the above may be obtained.

It may be clear that the invention is not restricted to the embodiments described and that many variations are possible for those skilled in the art without leaving the scope of the invention.

What is claimed is:

1. A wheel cap fixing device comprising a wheel disc including a center opening and at least four holes equidistant from said center opening, each of these holes being extended through by a stud bolt rigidly secured to a vehicle hub, a wheel cap covering said wheel disc and including at least four holes arranged so that each of these holes is positioned in alignment with each of said holes of the wheel disc and extended through by said stud bolt, an elastic washer of a rubber-like substance adapted to be engaged with that part of the wheel cap which surrounds each of said holes of the wheel cap, and a cap nut provided at its flank with a flange and adapted to be threadedly engaged with said stud bolt and assembled so that when the end of said cap nut extends through each of said holes of the wheel cap to fix the wheel disc to the vehicle hub said flange urges through said elastic washer that part of the wheel cap which surrounds the hole of the wheel cap against that part of the wheel disc which surrounds the hole of the wheel disc, said part of the wheel disc being provided with an annular indentation which surrounds said part of the wheel disc and said part of the wheel cap and said annular indentation of the wheel disc being always kept closely in contact with one another through a number of projections integral with said part of the wheel cap or with said annular indentation, while the outer periphery of the wheel cap being separated from the wheel disc surface thereby forming a heat radiating space.

2. A wheel cap fixing device as claimed in claim 1 wherein said wheel cap includes at least four legs projected downwards from the under surface of that part of the wheel cap which surround the hole of the wheel cap and said wheel disc having an annular indentation against which is urged said legs.

* * * * *